United States Patent
Angenete

(10) Patent No.: US 12,330,732 B2
(45) Date of Patent: Jun. 17, 2025

(54) METHOD OF CONTROLLING A STEERING SYSTEM

(71) Applicant: Volvo Truck Corporation, Gothenburg (SE)

(72) Inventor: Johan Angenete, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 184 days.

(21) Appl. No.: 18/266,009

(22) PCT Filed: Dec. 17, 2020

(86) PCT No.: PCT/EP2020/086793
§ 371 (c)(1),
(2) Date: Jun. 8, 2023

(87) PCT Pub. No.: WO2022/128103
PCT Pub. Date: Jun. 23, 2022

(65) Prior Publication Data
US 2024/0043064 A1    Feb. 8, 2024

(51) Int. Cl.
*B62D 7/22* (2006.01)
*B62D 6/00* (2006.01)
(Continued)

(52) U.S. Cl.
CPC ............. *B62D 7/224* (2013.01); *B62D 6/001* (2013.01); *B62D 6/002* (2013.01); *B62D 6/008* (2013.01);
(Continued)

(58) Field of Classification Search
CPC ........ B62D 5/0409–0415; B62D 6/001; B62D 6/002; B62D 6/008; B62D 7/224; B62D 15/0215
See application file for complete search history.

(56) References Cited

FOREIGN PATENT DOCUMENTS

DE         10101827 A1     7/2002
DE      102014219222 A1     4/2015
(Continued)

OTHER PUBLICATIONS

International Search Report and Written Opinion for International Patent Application No. PCT/EP2020/086793, mailed Aug. 27, 2021, 37 pages.
(Continued)

*Primary Examiner* — Mark L. Greene
(74) *Attorney, Agent, or Firm* — Withrow & Terranova, PLLC

(57) ABSTRACT

A method of controlling a steering system of a vehicle, the steering system comprising a first steering shaft, a second steering shaft, and a mechanical member comprising a first portion connected to the first steering shaft and a second portion connected to the second steering shaft. A mutual relative rotation between the first and second steering shafts is obtainable by an angular mechanical play between the first and second portions, the mechanical member being adapted to assume a first state in which a first angular mechanical play is provided between the first and second portions. An angular displacement between the first and second steering shafts is controlled, in response to an indication of the lateral acceleration, such that the mechanical member assumes a second state in which a second angular mechanical play is provided between the first and second portions.

16 Claims, 4 Drawing Sheets

(51) Int. Cl.
   *B62D 15/02*   (2006.01)
   *B62D 5/04*    (2006.01)
(52) U.S. Cl.
   CPC ........ *B62D 15/0215* (2013.01); *B62D 5/0415* (2013.01)

(56) References Cited

FOREIGN PATENT DOCUMENTS

| | | |
|---|---|---|
| EP | 1676767 A2 | 7/2006 |
| EP | 1676767 A3 | 8/2007 |
| EP | 2934986 B1 | 5/2018 |
| JP | 2006111065 A | 4/2006 |
| JP | 3869981 B2 * | 1/2007 |
| WO | 2014098655 A1 | 6/2014 |
| WO | 2017184064 A1 | 10/2017 |

OTHER PUBLICATIONS

International Preliminary Report on Patentability for International Patent Application No. PCT/EP2020/086793, mailed Mar. 1, 2023, 18 pages.

* cited by examiner

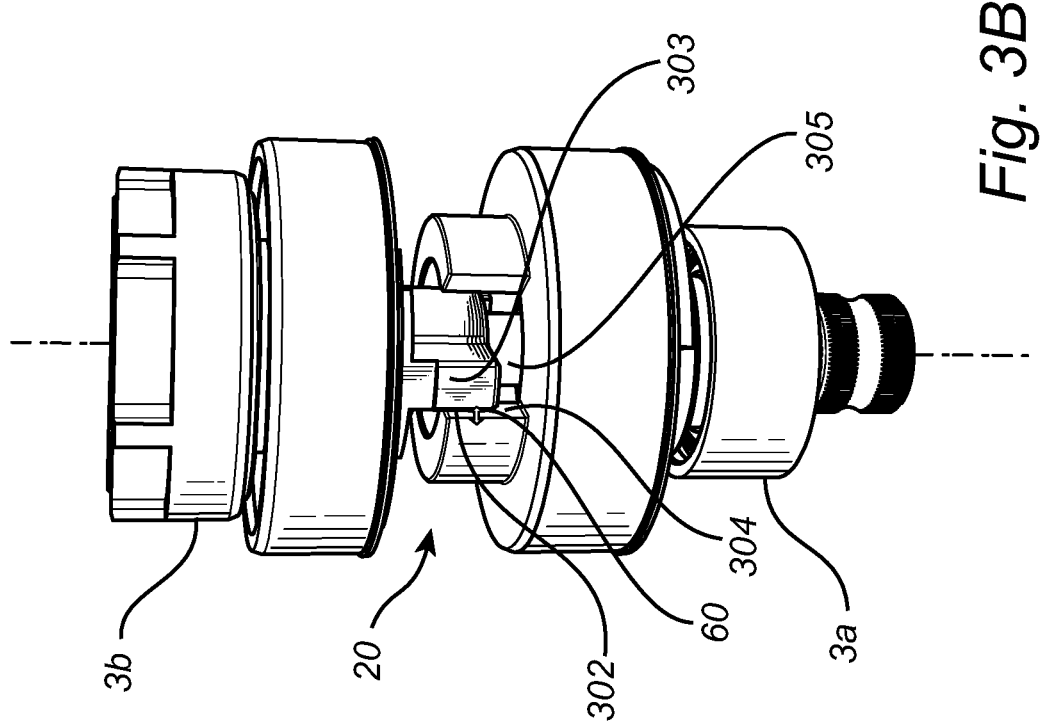
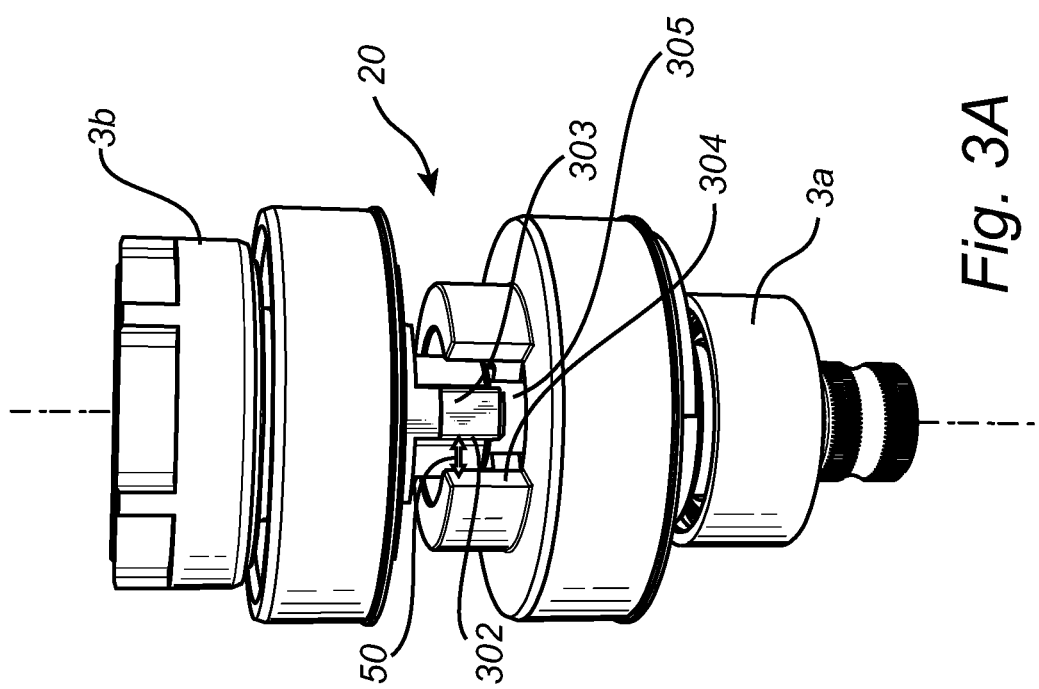

METHOD OF CONTROLLING A STEERING SYSTEM

This application is a 35 USC 371 national phase filing of International Application No. PCT/EP2020/086793, filed Dec. 17, 2020, the disclosure of which is incorporated herein by reference in its entirety.

TECHNICAL FIELD

The present disclosure relates to a method of controlling a steering system of a vehicle, a control unit for controlling a steering system and a vehicle comprising such a control unit. The method and control unit are preferably applicable to steering systems of heavy-duty vehicles, such as trucks. Although the method and control unit will mainly be described in relation to a truck, they are also applicable to other types of vehicles, such as passenger cars, buses, working machines, etc.

BACKGROUND

Steering systems of various types are available on the market and applied in vehicles. For example, a steering system can conventionally comprise a steering wheel connected to a steering column. The steering column is in turn connected to a steerable wheel axle using e.g. a rack and pinion or steering box arrangement between the steering column and the steerable wheel axle. Another, more recent development is a steer-by-wire system. In such a system, there is no mechanical link between the steering wheel and the steerable wheel axle. On the contrary, the steer-by-wire system uses an electrical system, or electro-mechanical system for performing vehicle functions traditionally achieved by mechanical linkages.

EP 2 934 986 describes a partially decoupled steering system comprising an upper steering shaft connected to the steering wheel, and a lower steering shaft connected to the steerable wheel axle. The decoupled steering system further comprises a mechanical interconnection connecting the upper and lower steering shafts to each other. The mechanical interconnection is hereby arranged as a force transmitting element for transmitting a torque between the steering wheel and the steerable wheel axle.

The main objective with the solution presented in EP 2 934 986 is to assist a driver of a vehicle during operation to provide a desired steering feel. This is achieved by the mechanical interconnection comprising a resilient material, allowing a fixed maximum mutual relative rotation between the upper and lower steering shafts between e.g. 5-20° depending on the type of resilient material chosen. For functional reasons it is desirable to allow as much mutual relative rotation between the upper and lower steering shafts. For example, allowing a large relative mutual relation between the upper and lower steering shafts makes the steering system less sensitive to sudden irregularities in the road surface, whereby the vehicle operator will not obtain a negative steering feeling when e.g. driving over a pothole, etc. Alternatively, the allowed relative mutual rotation can be utilized to provide electronically controlled steering adjustments to the steerable axle without rotating the steering wheel. It may also be used to provide certain responses to the driver via the steering wheel without affecting the steerable axle.

However, allowing a large relative rotation could adventure the safety of operation. When, for example, the vehicle is engaged in a turning maneuver and there is a power failure in the electric motors connected to the steering shafts, the vehicle will lose lateral acceleration until the upper shaft has been rotated to reach the maximum allowable relative rotation. During this time period of loss of lateral acceleration, the vehicle will move outwards from the intended trajectory until the lateral acceleration is restored, which in a worst case could result in the vehicle drives into the lane with heading traffic or drives off the road.

There is thus a desire to further improve the steering system described in EP 2 934 986 in terms of safety, while at the same time being able to obtain the advantages of a large mutual relative rotation between the upper and lower steering shafts.

SUMMARY

It is an object of the present disclosure to describe a method which at least partially overcomes the above described deficiencies. This is achieved by a method according to claim 1.

According to a first aspect, there is provided a method of controlling a steering system of a vehicle, the steering system comprising a first steering shaft connected to a steering device, a second steering shaft connected to at least one pair of wheels of the vehicle, and a mechanical member comprising a first portion connected to the first steering shaft and a second portion connected to the second steering shaft, wherein a mutual relative rotation between the first and second steering shafts is obtainable by an angular mechanical play between the first and second portions, the mechanical member being adapted to assume a first state in which a first angular mechanical play is provided between the first and second portions, the method comprising determining an indication of a lateral acceleration of the vehicle being above a predetermined threshold; and controlling, in response to the indication of the lateral acceleration, an angular displacement between the first and second steering shafts, such that the mechanical member assumes a second state in which a second angular mechanical play is provided between the first and second portions, wherein the second state allows a smaller mutual relative rotation between the first and second steering shafts compared to the first state.

The steering device can be either manually operable, i.e. controlled by an operator of the vehicle, or autonomously controlled. In the latter case, the steering device is preferably an additional motor which is arranged to control rotation of the first steering shaft.

Furthermore, the angular displacement between the first and second steering shafts should be construed such that the first and second steering shafts are rotated relative to each other.

The present disclosure is based on the insight that by allowing a smaller mutual relative rotation between the first and second steering shafts when the lateral acceleration of the vehicle is above a predetermined threshold, the risk of excessively leaving the intended trajectory if a power failure unexpectedly should occur is reduced. This is achieved since, in case of a power failure, the first and second portions will engage with each other relatively instantaneous and the steering operation can be continued without the need of e.g. functional electric motors. When the lateral acceleration is above the predetermined threshold, it can be assumed that the vehicle is engaged in a turning maneuver, and the relatively large angular mechanical play is thus maintained when the vehicle is driving substantially straight forward, and the mechanical member assumes the first state. Accordingly, the benefits of a large angular mechanical play are maintained while at the same time providing an increased safety of operation when engaging a turning maneuver. The predetermined threshold could preferably be set such that the angular displacement is controlled and adjusted when engaging a turn of a specific radius and length. Hereby, the angular displacement must not necessarily have to be adjusted when overtaking another vehicle, or when operating the steering device with low oscillations, etc.

According to an example embodiment, the method may further comprise determining, in response to the indication of the lateral acceleration, a turning direction of the vehicle; and controlling the angular displacement between the first and second steering shafts by angularly displacing the first steering shaft relative to the second steering shaft in the turning direction of the vehicle.

Thus, the angular mechanical play is reduced in the same direction as the turning direction, so that the distance between the first and second portions is reduced for more rapid engagement if a power failure should occur.

According to an example embodiment, the method may further comprise controlling the angular displacement between the first and second steering shafts to assume the second state at a predetermined time period after determining the indication of the lateral acceleration.

An advantage is that the adjustment is not executed immediately, thus not activated for minor steering maneuvers, such as when overtaking a vehicle, a minor temporary curvature of the road, etc.

According to an example embodiment, the method may further comprise controlling the angular displacement to gradually transition from the first state to the second state.

Hereby, an operator of the vehicle will not notice that the angular mechanical play is reduced, compared to a quick adjustment from the first state to the second state. Also, if the lateral acceleration suddenly falls below the predetermined threshold, i.e. the vehicle is no longer engaging a turning maneuver, the angular displacement can be quickly restored such that the mechanical member assumes the first state. The gradual transition can also be advantageous for an autonomously controlled vehicle, where the gradual transition enables for a smooth change between the first and second states.

According to an example embodiment, the method may further comprise receiving a signal indicative of a desire vehicle safety operation, and controlling, based on the desired vehicle safety operation for the vehicle, the angular displacement to transition from the first state to the second state. Thus, if there is a desire to operate the vehicle in a safe manner, the angular displacement can be controlled. The increased safety operation of the vehicle thus enables for an increased safety, but a lower allowable relative rotation is provided between the first and second steering shafts until the first and second steering shafts rotates in conjunction with each other. An external signal may thus be received by the steering system with information regarding the desire to increase the vehicle safety during a specific operating condition.

According to an example embodiment, the second steering shaft may be rotated in response to a requested rotation of the first steering shaft, wherein the transition from the first state to the second state is obtained by the second steering shaft being rotated to a lower degree compared to a requested rotation from the first steering shaft.

The second steering shaft is hereby lagging behind the first steering shaft, which means that the steering device of the first steering shaft needs to be rotated to a larger extent to achieve the desired steering radius. The second steering may comprise an electric motor or other actuator. In such a case, the electric motor may preferably be controlled to rotate the second steering shaft to a lower degree.

According to an example embodiment, the second angular mechanical play may be based on the amount of lateral acceleration. According to an example embodiment, the second angular mechanical play may be reduced relative to an increased lateral acceleration.

Hereby, when the vehicle is exposed to a large lateral acceleration, e.g. the vehicle operates in a relatively long curved road path with a substantial amount of applied steering, the angular mechanical play is smaller compared to a situation where the vehicle is exposed to less lateral acceleration. An advantage is thus that the first and second portions will engage more rapidly when the lateral acceleration is large.

According to an example embodiment, the allowed mutual relative rotation of the second angular mechanical play may be based on a current vehicle speed. Hereby, a further parameter is given as a boundary condition for the second angular mechanical play, whereby an increased vehicle speed provides a lower mutual relative rotation between the first and second steering shafts.

According to an example embodiment, the indication of the lateral acceleration may be determined based on a current steering operation of the vehicle and a current vehicle speed. As an alternative, or in addition, and according to an example embodiment, the indication of the lateral acceleration may be determined based on an input signal received from a yaw rate sensor of the vehicle.

According to a second aspect, there is provided a control unit for controlling a steering system of a vehicle, wherein the steering system comprises a first steering shaft comprising a first actuator connected to the control unit, a second steering shaft connected to at least one pair of wheels of the vehicle, the second steering shaft comprises a second actuator connected to the control unit, and a mechanical member comprising a first portion connected to the first steering shaft and a second portion connected to the second steering shaft, wherein a mutual relative rotation between the first and second steering shafts is obtainable by an angular mechanical play between the first and second portions, the mechanical member being adapted to assume a first state in which a first angular mechanical play is provided between the first and second portions, wherein the control unit comprises control circuit configured to receive a signal indicative of a lateral acceleration of the vehicle being above a predetermined threshold; and transmit, in response to the indication of the lateral acceleration, a control signal to at least one of the first and second actuators, the control signal representing instructions to the at least one actuator to generate an angular displacement between the first and second steering shafts, such that the mechanical member assumes a second state in which a second angular mechanical play is provided between the first and second portions, wherein the second state allows a smaller mutual relative rotation between the first and second steering shafts compared to the first state.

An advantage of the control unit configured according to the above disclosure is that the steering of the steerable wheels could be controlled solely by means of the second actuator of the second steering shaft. The first actuator may in this case only maintain the angular mechanical play between the first and second portions. However, if the second actuator for some reason would fail to function when the vehicle is exposed to a lateral acceleration, the first actuator can be controlled to take over the steering action of the steerable wheels. By controlling the angular displacement to assume the second state, the first and second portions will hereby engage with each other more rapidly in order to control steering by means of the first actuator. The control unit is thus operable and serves the purpose described above in relation to the first aspect even without a steering device.

The first and second actuators may preferably be a first and a second electric motor, respectively. Thus, when operating the vehicle, the first and second electric motors are controlled such as to provide the first mechanical angular play between the first and second steering shafts. The second electric motor is arranged to control the steering operation of the wheels of the vehicle, while the first electric motor is mainly arranged to provide the operator with a proper steering feeling. When engaging a turning maneuver, at least one of the electric motors, preferably the second electric motor, is controlled to generate the angular displacement between the first and second steering shafts. As an option, the first and second actuators may be a first and second hydraulic motor, respectively.

According to an example embodiment, the steering system may further comprise a first angle sensor connected to the control unit, wherein the control circuit is configured to receive a signal indicative of a current angular displacement of the first steering shaft from the first angle sensor.

According to an example embodiment, the steering system may further comprise a second angle sensor connected to the control unit, wherein the control circuit is configured to receive a signal indicative of a current angular displacement of the second steering shaft from the second angle sensor.

The first and second angle sensors thus keeps track of the angular position of the first and second steering shafts, respectively.

Further effects and features of the second aspect are largely analogous to those described above in relation to the first aspect.

According to a third aspect, there is provided a vehicle comprising a steering system for controlling steering operation of the vehicle, the steering system comprising a first steering shaft comprising a first actuator, a second steering shaft connected to at least one pair of steerable wheels of the vehicle, the second steering shaft comprising a second actuator, and a mechanical member comprising a first portion connected to the first steering shaft and a second portion connected to the second steering shaft, wherein a mutual relative rotation between the first and second steering shafts is obtained by an angular mechanical play between the first and second portions, wherein the vehicle further comprises a control unit according to any one of the embodiments described above in relation to the second aspect, wherein the control unit is connected to the first and second actuators.

According to a fourth aspect, there is provided a computer readable medium carrying a computer program comprising program code means for performing the steps of any one of the embodiments described above in relation to the first aspect when the program means is run on a computer.

According to a fifth aspect, there is provided a computer program comprising program code means for performing the steps of any one of the embodiments described above in relation to the first aspect when the program is run on a computer.

Effects and features of the third, fourth and fifth aspects are largely analogous to those described above in relation to the first and second aspects.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein:

FIG. 3 is a perspective view of a mechanical member of the steering system according to an example embodiment;

DETAILED DESCRIPTION

Figure 1:
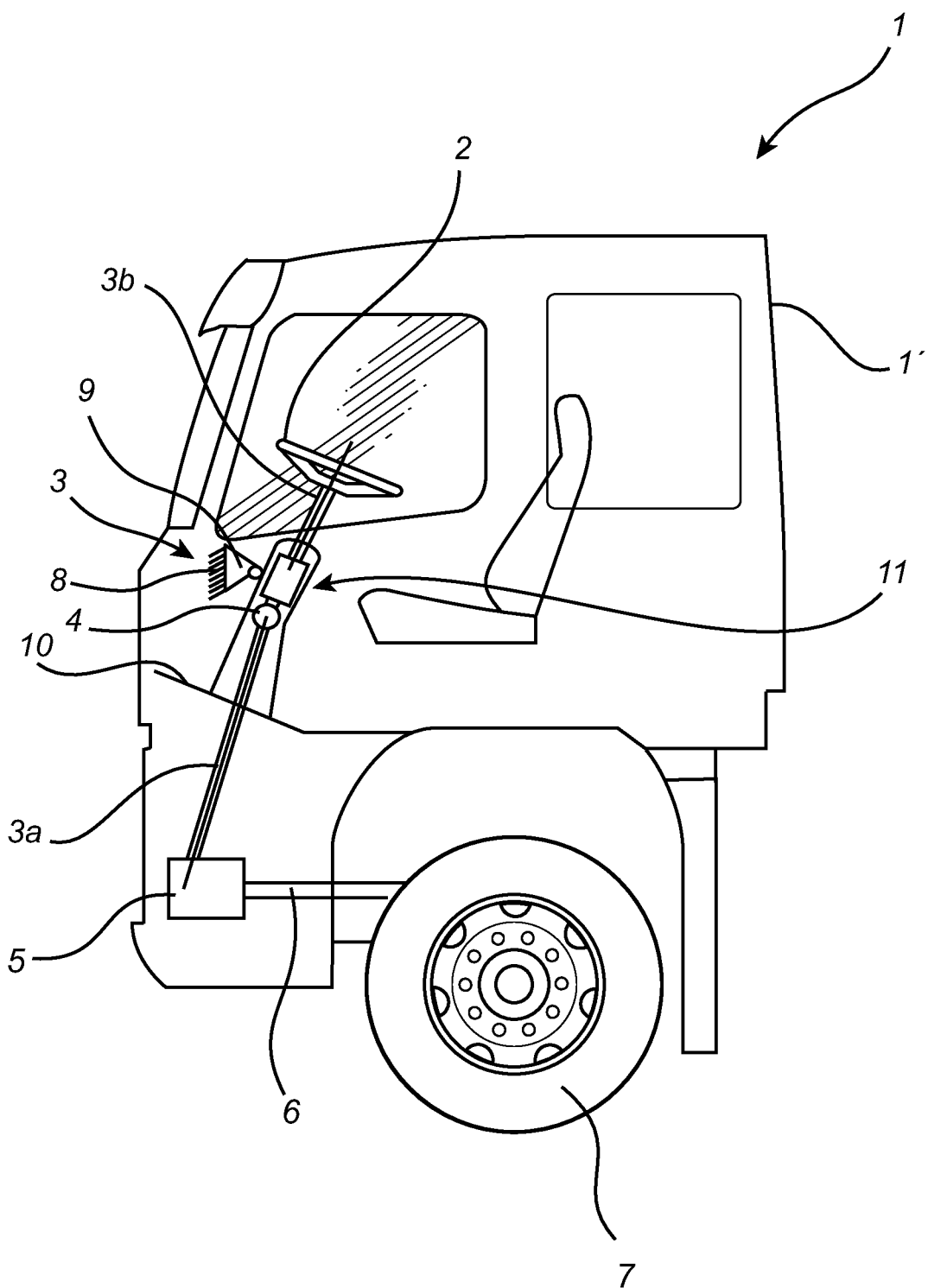
FIG. 1 is a side view illustrating a vehicle according to an example embodiment.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

FIG. 1 is a side view of a vehicle 1 in the form of a truck. FIG. 1 particularly illustrates the cab 1' of the vehicle 1. The cab 1' comprises a steering wheel 2 for controlling steering operations of the vehicle 1. The steering wheel 2 is connected to a steering main shaft 3 which comprises a first, upper steering shaft 3b and a second, lower steering shaft 3a. The steering main shaft 3 is schematically indicated and may optionally comprise additional components, such as one or more universal joints 4 if required. The steering main shaft 3 is connected to a steering gear 5 which, via a steering linkage 6, can act on a pair of wheels 7 in order to steer the vehicle 1. The steering main shaft 3 can further extend in a support 8, the upper part of which is provided with an attachment 9 mounted on the cab or dashboard of the vehicle, and the lower part of which is fixed to the floor 10 of the cab. A steering system 11, which will be described in further detail below with reference to FIGS. 2. 3b, for assisting a driver of the vehicle 1 is arranged between the first 3b and second 3a steering shafts. The arrangement depicted in FIG. 1 should be construed as one of a plurality of conceivable steering arrangements, and is used for illustrative purposes only. As an example, the steering system 11 may be positioned above and in the vicinity of the steering gear 5. Thus, the following disclosure is applicable for other types of arrangements as well, such as e.g. an autonomously controlled steering arrangement where the vehicle is not provided with the above described steering wheel 2.

Figure 2:
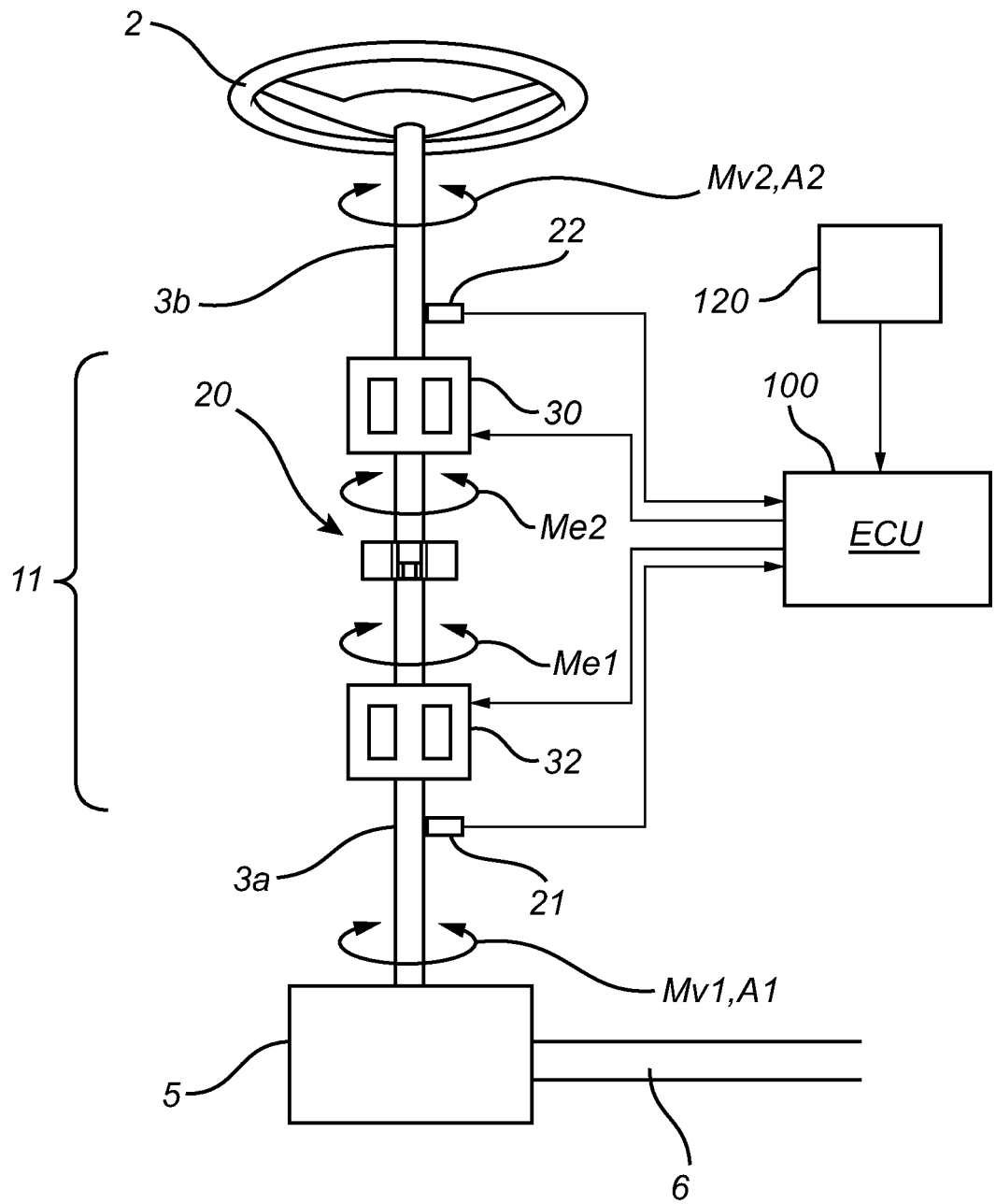
FIG. 2 is a schematic illustration of a steering system according to an example embodiment.

Turning to FIG. 2 which is a more detailed illustration of the arrangement described above. As was also indicated above, the steering system 11 comprises a first steering shaft 3b connected to the steering wheel 2, and a second steering shaft 3a connected to at least one pair of wheels 7 of the vehicle 1. In the depicted embodiment, the second steering shaft 3a is connected to the steerable wheels via the steering gear 5 and the steering linkage 6. The steering system 11 further comprises a mechanical member 20 arranged between the first 3b and second 3a steering shafts, a first angle sensor 22, a second angle sensor 21, a first actuator 30, exemplified as in the form of a first electric motor and a second actuator 32, exemplified as in the form of a second electric motor. The steering system 11 also comprises a control unit 100 connected to a yaw rate sensor 120 for receiving signals indicative of a lateral acceleration of the vehicle 1. The control unit 100 is further connected to each of the first angle sensor 22, the second angle sensor 21, the first actuator 30 and the second actuator 32.

The control unit 100 comprises control circuitry which may each include a microprocessor, microcontroller, programmable digital signal processor or another programmable device. The control circuitry may also, or instead, each include an application specific integrated circuit, a programmable gate array or programmable array logic, a programmable logic device, or a digital signal processor. Where the control circuitry includes a programmable device such as the microprocessor, microcontroller or programmable digital signal processor mentioned above, the processor may further include computer executable code that controls operation of the programmable device. It should be understood that all or some parts of the functionality provided by means of the control circuitry may be at least partly integrated with the control unit for controlling operation of the steering system.

The first angle sensor 22 is connected to the first steering shaft 3b and arranged to detect an angular position of the first steering shaft 3b. The second angle sensor 21 is connected to the second steering shaft 3a and arranged to detect an angular position of the second steering shaft 3a. Moreover, the first actuator 30 is connected to the first steering shaft 3b and the second actuator 32 is connected to the second steering shaft 3a. Further, by means of the signals received from the first 22 and second 21 angle sensors, the control unit 100 is arranged to determine a current state of the steering system 11. The current state of the steering system 11 is dependent on the angles detected by these sensors, as well as on the current loading on the steering system. The current loading may be proportional to the lateral acceleration of the vehicle, which is received from the yaw rate sensor 120. Although the example in FIG. 2 illustrates a yaw rate sensor 120 to detect the lateral acceleration, this lateral acceleration can be determined by other conventional means, such as by other available sensors on the vehicle, for example an acceleration sensor or a vehicle speed sensor in combination with vehicle chassis data (vehicle wheel-base, etc.).

The mechanical member 20 arranged between the first 3b and second 3a steering shafts is arranged to allow a relative mutual rotation between the first 3b and second 3a steering shafts. As will be described in further detail below, the mechanical member 20 comprises a first portion (see FIGS. 3a-3b) and a second portion (see FIGS. 3a-3b), whereby the relative mutual rotation is obtainable by means of an angular mechanical play between the first and second portions of the mechanical member 20. When the mutual relative rotation reaches the displacement angle of the mechanical play, the first and second portions are arranged in contact with each other and the first 3b and second 3a steering shafts will thereafter rotate together.

The first 30 and the second 32 actuators are individually controllable and are arranged to rotate the first steering shaft 3b and the second steering shaft 3a, respectively, either in the same or in opposite directions in response to the detected angular positions of the steering wheel 2 and the angle of the wheels, as represented by the second steering shaft 3a, and the current state of the steering system. As described, the mechanical member 20 is arranged to allow an angular difference between the first steering shaft 3b and the second steering shaft 3a.

In general, the first 30 and second 32 actuators can be controlled to act in the same direction in order to provide servo assistance for turning the wheels, either instead of or in conjunction with an existing servo mechanism or steering gear. Alternatively, the first 30 and the second 32 actuators can be controlled to act in opposite directions in order to provide an enhanced steering feel and to assist the driver under predetermined conditions, for instance when unexpected or undesirable feedback is transmitted towards the steering wheel from the wheels or the steering linkage.

In FIG. 2, a torque Mv2, which is the torque applied by the driver and a torque Mv1, which is the torque required to achieve a desired angle for the wheels as requested by the driver through the steering wheel 2. Similarly, a torque Me1, which is the torque applied to the second steering shaft 3a by the second actuator 32, and a torque Me2, which is the torque applied to the first steering shaft 3b by the second actuator 30.

In order to describe the mechanical member 20 in further detail, reference is made to FIGS. 3a and 3b. As described above, the mechanical member 20 comprises a first portion 302 connected to the first steering shaft 3b, and a second portion 304 connected to the second steering shaft 3a. In the example embodiment depicted in FIGS. 3a-3b, the first portion 302 is arranged as a yoke 303 having a protrusion positioned in a recess 305 of the second portion 304. The yoke 303 thus protrudes radially as seen relative to a longitudinal direction of the steering shafts. The yoke 303 has a width which is smaller than a width of the recess 305. Hereby, the first 3b and second 3a steering shafts are allowed to rotate relative to each other until an end portion of the yoke 303 abuts an end portion of the recess 305.

With particular reference to FIG. 3a, which illustrates the mechanical member assuming a first state. In FIG. 3a, the yoke 303 is substantially centrally position within the recess 305 of the second portion 304. Hereby, a first angular mechanical play 50 is provided between the first 302 and second portions 304. In particular, the first angular mechanical play 50 is provided between the end portion of the yoke 303 and the end portion of the recess 305.

As can be seen in FIG. 3b, the first 3b and second 3a steering shafts can be rotated relative to each other such that the mechanical member 20 assumes a second state. In the second state, a second mechanical play 60 is provided between the first 302 and second portions 304, i.e. provided between the end portion of the yoke 303 and the end portion of the recess 305. The second mechanical play 60 is thus smaller compared to the first mechanical play 50.

Figure 4:
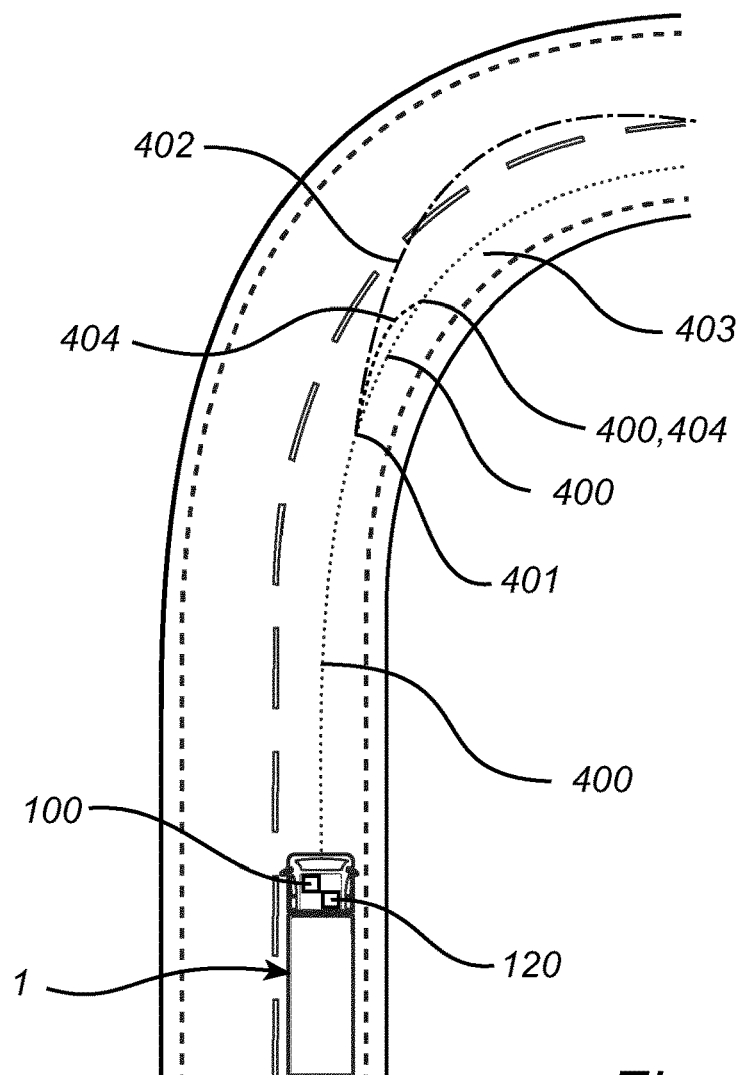
FIG. 4 is an illustration of a driving scenario where the vehicle engages a turning maneuver according to an example embodiment.

Now, reference is made to FIG. 4, in combination with the illustration in FIGS. 2-3b, for describing an operation scenario for controlling the steering system 11 when driving the vehicle in a turn. As can be seen in FIG. 4, the vehicle 1 is driving straight ahead, following a desired road path 400, and is approaching a curve 403. As the vehicle 1 is driving straight ahead, the mechanical member 20 assumes the first state depicted in FIG. 3a, where the first mechanical play 50 is provided between the first 302 and second 304 portions of the mechanical member 20. As the vehicle is travelling straight ahead, the torque input Mv2 from the driver and the torque output Mv1 to the wheels is zero. Further, the second steering angle A2 for the first steering shaft is zero, as the driver is not turning the steering wheel 2. However, the deflection of the wheel may cause a displacement of the steering linkage, inducing a fluctuating rotation of the second steering shaft and a corresponding change in the first steering angle A1. By controlling the first 30 and second 32 actuators to apply a fluctuating torque Me1, Me2 in equal and opposite directions, it is possible to counteract a fluctuating torque transmitted from the wheels to the steering wheel. In this way it is possible to prevent or at least reduce dynamic steering errors from being transmitted to the steering wheel.

When the vehicle 1 arrives at the curve 403 and is initiated steering to follow the desired road path 400 of the curve 403, a signal is received by the control unit 100 from the yaw rate sensor 120, which signal is indicative of a lateral acceleration of the vehicle 1. Thus, the control unit 100 determines that the vehicle 1 is exposed to a lateral acceleration which indicates that the vehicle is turning.

The following will describe two operational scenarios that can occur if the vehicle, when being operated in the curve 403, is suddenly exposed to a power loss of the actuator 30, 32, i.e. the first actuator 30 is unable to generate the torque Me2 to the first steering shaft 3b and/or the second actuator 32 is unable to generate the torque Me1 to the second steering shaft 3a. In the example embodiment depicted in FIG. 3, the loss of power occurs at the position indicated by reference numeral 401.

According to a first example, if the first angular mechanical play 50, depicted in FIG. 3a, is maintained when arriving at the position 401 of loss of power, i.e. the mechanical member 20 assumes the first state also when engaged in the curve 403, the vehicle 1 will not be able to properly follow the desired road path 400. The reason is that when the driver turns the steering wheel 2, the second steering shaft 3a will not be exposed to an immediate rotation in response to the steering input from the driver, due to the first angular mechanical play 50. Hereby, the vehicle will move outwards from the intended and desired trajectory, indicated by reference numeral 402, until the first portion 302 of the mechanical member 20 abuts the second portion 304 of the mechanical member 20. When the first 302 and second 304 portions are in physical contact with each other, the driver can increase the steering action to return to the desired road path 400.

However, and as is one of the main objectives of the present disclosure, when the control unit 100 determines that the vehicle 1 is exposed to a lateral acceleration, a precautionary measure can be taken to avoid the risk that e.g. the vehicle 1 departs from the lane as depicted by the driving direction depicted by reference numeral 402. According to the present disclosure, when the vehicle is exposed to a lateral acceleration, the angular displacement between the first 3b and second 3a steering shafts is controlled, such that the mechanical member assumes the second state, which is described above and depicted in FIG. 3b. In the second state, a second, smaller angular mechanical play 60 is provided between the first and second portions. Hereby, when the vehicle 1 is engaged in the turn 403 and the actuators are exposed to power failure, the driver will need to turn the steering wheel to a smaller degree until the first portion 302 of the mechanical member 20 abuts the second portion 304 of the mechanical member 20. Hereby, a mechanical link between the first 3b and second 3a steering shafts is obtained more rapidly and the vehicle 1 will move from the intended and desired trajectory to a smaller degree compared to the above example of maintaining the mechanical member to assume the first state. As can be seen in the example embodiment depicted in FIG. 4, the vehicle 1 will, when precautionary controlling the angular displacement between the first 3b and second 3a steering shaft, move slightly out from the intended trajectory as illustrated by reference numeral 404. The operator can hereby control steering of the vehicle to quickly return to the desired trajectory.

As is evident from the above disclosure, the angular displacement between the first 3b and second 3a steering shafts may preferably be controlled by angularly displacing the first steering shaft 3b relative to the second steering shaft 3a in the direction of the turn. Hence, the second angular mechanical play 60 is smaller in the same direction as the turning direction of the turn to be able to rapidly arrange the first and second portions in abutment with each other during a power failure.

Moreover, the angular displacement between the first 3b and second 3a steering shafts may be controlled to assume the second state at a predetermined time period after determining the indication of the lateral acceleration. Thus, the mechanical member 20 may be arranged to transition from the first state to the second state a short time period after the vehicle 1 is engaged in the curve 403. Also, the angular displacement may gradually transition from the first state to the second state so that the driver of the vehicle is affected as little as possible by the transition.

Furthermore, the second angular mechanical play 60 is preferably based on the amount of lateral acceleration exposed to the vehicle 1, wherein the angular second mechanical play is smaller for larger lateral accelerations, and larger for smaller lateral accelerations. The second angular mechanical play 60 can also be based on the current vehicle speed.

According to a preferred embodiment, the transition from the first state to the second state, i.e. the transition from the first angular mechanical play 50 depicted in FIG. 3a to the second angular mechanical play 60 depicted in FIG. 3b, is preferably obtained by rotating the second steering shaft 3a to a lower degree compared to the rotation of the first steering shaft 3b. This is preferably executed by controlling the applied torques by the first 30 and second 32 actuators.

Figure 5:
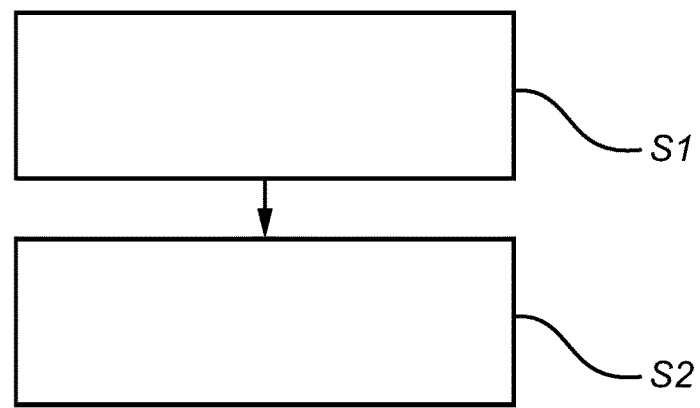
FIG. 5 is a flow chart of a method of controlling the steering system depicted in FIG. 2 according to an example embodiment.

In order to sum up, reference is made to FIG. 5 which is a flow chart of a method of controlling the above described steering system 11. During operation of the vehicle, an indication of a lateral acceleration is determined S1. The lateral acceleration should be determined to be above a predetermined threshold to be able to indicate that the vehicle 1 is engaged in a curve 403. The determination of the lateral acceleration may be obtained by e.g. a yaw rate sensor 120 of the vehicle, and/or based on a current steering operation of the vehicle and a current speed of the vehicle.

In response to the indication of the lateral acceleration, the angular displacement between the first 3b and second 3a steering shafts is controlled S2 such that the mechanical member 20 assumes the above described second state. In the second state, a second angular mechanical play 60 is provided between the first and second portions of the mechanical member 20. The second angular mechanical play thus allows a smaller mutual relative rotation between the first 3b and second 3a steering shafts compared to the first state, i.e. when the first angular mechanical play 50 is provided between the first 302 and second 304 portions of the mechanical member 20.

It is to be understood that the present disclosure is not limited to the embodiments described above and illustrated in the drawings; rather, the skilled person will recognize that many changes and modifications may be made within the scope of the appended claims.

The invention claimed is:

1. A method of controlling a steering system of a vehicle, the steering system comprising:
a first steering shaft connected to a steering device;
a second steering shaft connected to at least one pair of wheels of the vehicle; and
a mechanical member comprising a first portion connected to the first steering shaft and a second portion connected to the second steering shaft;
wherein a mutual relative rotation between the first steering shaft and the second steering shaft is obtainable by an angular mechanical play between the first portion and the second portion;
wherein the first portion and the second portion are arranged in contact with each other when the mutual relative rotation reaches a displacement angle corresponding to the angular mechanical play; and
wherein the mechanical member is configured to assume a first state in which a first angular mechanical play is provided between the first portion and the second portion, the method comprising:
determining, by receiving a signal indicative of a lateral acceleration of the vehicle, that the lateral acceleration is above a predetermined threshold; and
controlling, in response to the lateral acceleration being above the predetermined threshold, an angular displacement between the first steering shaft and the second steering shaft, such that the mechanical member assumes a second state in which a second angular mechanical play is provided between the first portion and the second portion;
wherein the second state allows a smaller mutual relative rotation between the first steering shaft and the second steering shaft compared to the first state.

2. The method of claim 1, further comprising:
determining, in response to the indication of the lateral acceleration, a turning direction of the vehicle; and
controlling the angular displacement between the first steering shaft and the second steering shaft by angularly displacing the first steering shaft relative to the second steering shaft in the turning direction of the vehicle.

3. The method of claim 1, further comprising:
controlling the angular displacement between the first steering shaft and the second steering shaft to assume the second state at a predetermined time period after determining the lateral acceleration being above the predetermined threshold.

4. The method of claim 1, further comprising:
controlling the angular displacement to gradually transition from the first state to the second state.

5. The method of claim 1, wherein:
the second steering shaft is rotated in response to a requested rotation of the first steering shaft; and
the transition from the first state to the second state is obtained by the second steering shaft being rotated to a lower degree compared to a requested rotation from the first steering shaft.

6. The method of claim 1, wherein the second angular mechanical play is based on an amount of lateral acceleration.

7. The method of claim 6, wherein the second angular mechanical play is reduced relative to an increased lateral acceleration.

8. The method of claim 1, wherein an allowed mutual relative rotation of the second angular mechanical play is based on a current vehicle speed.

9. The method of claim 1, wherein the signal indicative of the lateral acceleration is determined based on a current steering operation of the vehicle and a current vehicle speed.

10. The method of claim 1, wherein the signal indicative of the lateral acceleration is determined based on an input signal received from a yaw rate sensor of the vehicle.

11. The method of claim 1, the method further comprising:
receiving a signal indicative of a desired vehicle safety operation for the vehicle; and
controlling, based on the desired vehicle safety operation, the angular displacement to transition from the first state to the second state.

12. A computer program product comprising a non-transitory computer readable medium having stored thereon a computer program comprising instructions for performing the method of claim 1 when the computer program is run on a computer.

13. A control unit for controlling a steering system of a vehicle, wherein the steering system comprises:
a first steering shaft comprising a first actuator connected to the control unit;
a second steering shaft connected to at least one pair of wheels of the vehicle, the second steering shaft comprising a second actuator connected to the control unit; and
a mechanical member comprising a first portion connected to the first steering shaft and a second portion connected to the second steering shaft;
wherein a mutual relative rotation between the first and second steering shafts is obtainable by an angular mechanical play between the first portion and the second portion;
wherein the first portion and the second portion are arranged in contact with each other when the mutual relative rotation reaches a displacement angle corresponding to the angular mechanical play;
wherein the mechanical member is configured to assume a first state in which a first angular mechanical play is provided between the first portion and the second portion; and
wherein the control unit comprises a control circuit configured to:
receive a signal indicative of a lateral acceleration of the vehicle being above a predetermined threshold; and
transmit, in response to the indication of the lateral acceleration being above the predetermined threshold, a control signal to at least one of the first actuator and the second actuator, the control signal representing instructions to the at least one of the first actuator and the second actuator to generate an angular displacement between the first steering shaft and the second steering shaft, such that the mechanical member assumes a second state in which a second angular mechanical play is provided between the first portion and the second portion;
wherein the second state allows a smaller mutual relative rotation between the first steering shaft and the second steering shaft compared to the first state.

14. The control unit of claim 13, wherein:
the steering system further comprises a first angle sensor connected to the control unit; and the control circuit is configured to receive a signal indicative of a current angular displacement of the first steering shaft from the first angle sensor.

15. The control unit of claim 14, wherein:
the steering system further comprises a second angle sensor connected to the control unit; and
the control circuit is configured to receive a signal indicative of a current angular displacement of the second steering shaft from the second angle sensor.

16. A vehicle comprising a steering system for controlling steering operation of the vehicle, the steering system comprising:
a first steering shaft comprising a first actuator;
a second steering shaft connected to at least one pair of steerable wheels of the vehicle, the second steering shaft comprising a second actuator; and
a mechanical member comprising a first portion connected to the first steering shaft and a second portion connected to the second steering shaft;
wherein a mutual relative rotation between the first steering shaft and the second steering shaft is obtained by an angular mechanical play between the first portion and the second portion;
wherein the vehicle further comprises the control unit of claim 13; and
wherein the control unit is connected to the first actuator and the second actuator.

\* \* \* \* \*